US011295172B1

(12) United States Patent
Chen et al.

(10) Patent No.: US 11,295,172 B1
(45) Date of Patent: Apr. 5, 2022

(54) OBJECT DETECTION IN NON-PERSPECTIVE IMAGES

(71) Applicant: Snap Inc., Santa Monica, CA (US)

(72) Inventors: Kevin Xie Chen, Castro Valley, CA (US); Shree K. Nayar, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/418,611

(22) Filed: May 21, 2019

Related U.S. Application Data

(60) Provisional application No. 62/674,351, filed on May 21, 2018.

(51) Int. Cl.
| | | |
|---|---|---|
| *G06K 9/62* | (2006.01) | |
| *H04N 5/232* | (2006.01) | |
| *G06T 7/70* | (2017.01) | |
| *G06K 9/00* | (2006.01) | |
| *H04N 5/262* | (2006.01) | |
| *G06T 3/40* | (2006.01) | |
| *G06T 3/20* | (2006.01) | |

(52) U.S. Cl.
CPC ....... *G06K 9/6261* (2013.01); *G06K 9/00228* (2013.01); *G06T 3/20* (2013.01); *G06T 3/40* (2013.01); *G06T 7/70* (2017.01); *H04N 5/23238* (2013.01); *H04N 5/2628* (2013.01); *G06T 2200/24* (2013.01); *G06T 2207/10004* (2013.01); *G06T 2207/10016* (2013.01); *G06T 2207/20004* (2013.01); *G06T 2207/20021* (2013.01); *G06T 2207/20081* (2013.01); *G06T 2207/30201* (2013.01)

(58) Field of Classification Search
CPC .......... G06T 7/248; G06T 7/277; G06T 7/70; G06T 7/223; G06T 2207/10016; G06T 2210/12; G06T 2207/30201; G06T 2207/20084; G06K 9/00261; G06K 9/00744; G06K 9/36; G06K 9/00228; G06K 9/00288; G06K 9/6274; G06K 9/00677; G06K 9/4628
See application file for complete search history.

(56) References Cited

U.S. PATENT DOCUMENTS

| | | | | |
|---|---|---|---|---|
| 9,965,865 | B1 * | 5/2018 | Agrawal | ................. G06T 7/194 |
| 2015/0363670 | A1 * | 12/2015 | Sugishita | ............... H04N 7/181 |
| | | | | 382/155 |

(Continued)

*Primary Examiner* — Neil R Mikeska
(74) *Attorney, Agent, or Firm* — Schwegman Lundberg & Woessner, P.A.

(57) ABSTRACT

Method of detecting objects in non-perspective images starts by generating an arrangement of tiles based on a field of view of a non-perspective camera lens, a predetermined size of the tiles, and a predetermined maximum object radius.
The arrangement of the tiles includes the minimum number of tiles to cover the field of view. A non-perspective image is then captured using the non-perspective camera lens. The non-perspective image may be a still image frame or a video. Using the tiles, a plurality of images are generated, respectively, and at least a portion of a first object is detected in one or more images. The first object is generated using the one or more images that include the at least the portion of the first object, and the first object is displayed on a display interface. Other embodiments are described herein.

20 Claims, 12 Drawing Sheets

(56) References Cited

U.S. PATENT DOCUMENTS

| | | | |
|---|---|---|---|
| 2018/0191956 A1* | 7/2018 | Nomura | G03B 7/091 |
| 2019/0026538 A1* | 1/2019 | Wang | G06T 7/20 |
| 2019/0130594 A1* | 5/2019 | Seyfi | G06T 7/248 |

* cited by examiner

OBJECT DETECTION IN NON-PERSPECTIVE IMAGES

PRIORITY

This patent application claims the benefit of priority to U.S. Provisional Patent Application Ser. No. 62/674,351, filed on May 21, 2018, which is hereby incorporated by reference herein in its entirety.

BACKGROUND

Currently, a wide-range of cameras that capture different perspectives are available to consumers. Generally, cameras include a rectilinear lens that captures perspective images (or the rectilinear perspective), in which straight elements (e.g., walls) appear as straight lines. In contrast, cameras that include a fisheye lens produces non-perspective images in which the straight elements appear curved. These non-perspective images captured with the fisheye lens are curvilinear and wide-angled. Other examples of cameras that capture non-perspective images include the omnidirectional camera (i.e., 360 cameras).

The non-perspective images thus include distortions to the objects that are captured. The objects in the center of the non-perspective image are the least distorted whereas the objects farther from the center of the non-perspective image are the most distorted. Given these distortions, current object recognition techniques cannot accurately identify the objects in non-perspective images.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
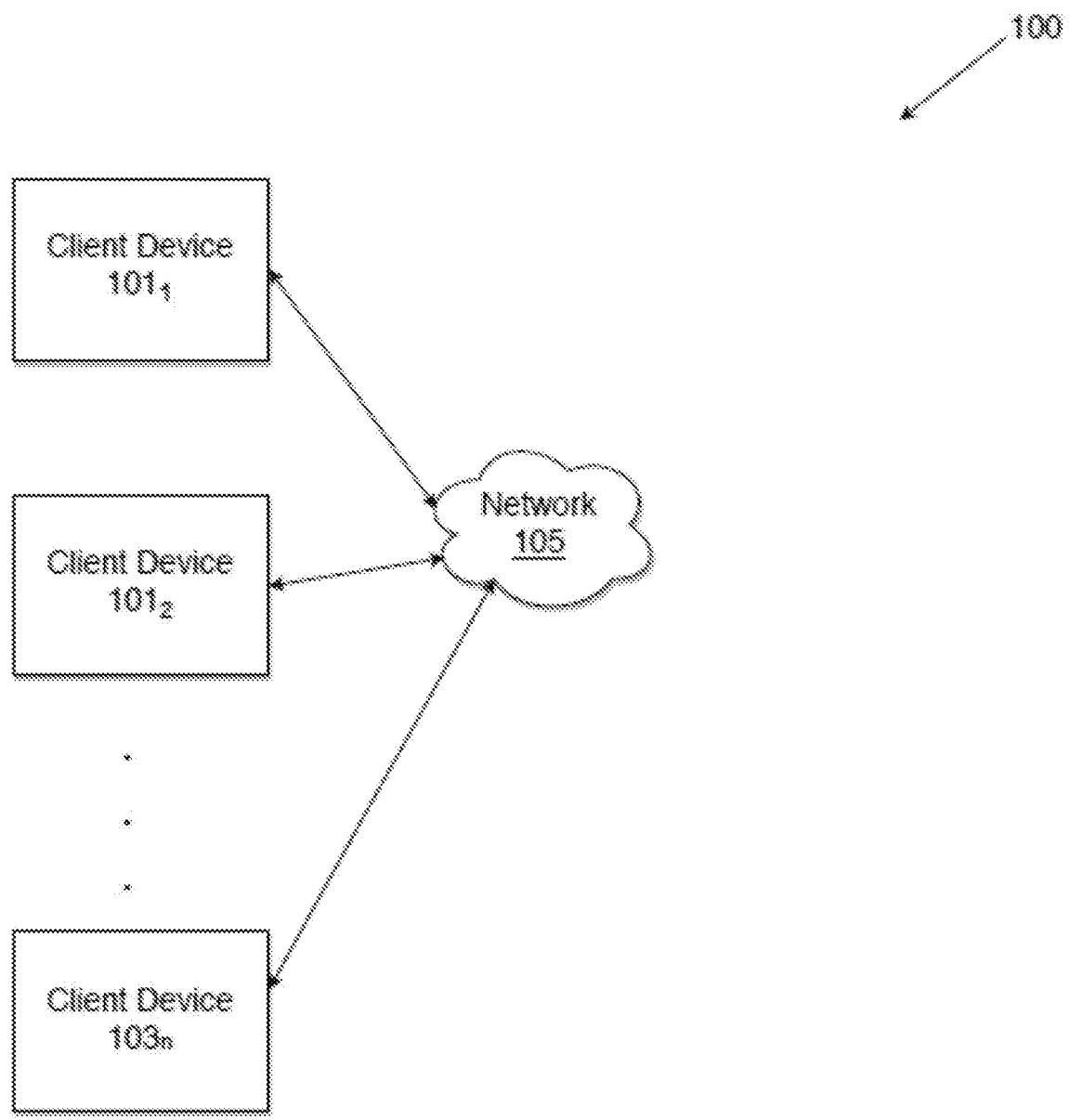
FIG. 1 is a block diagram showing a system for exchanging data (e.g., images, photos, video, messages) over a network according to one example embodiment.

FIG. 1 is a block diagram showing a system 100 for exchanging data (e.g., images, photos, video, messages) over a network according to one example embodiment. The system 100 includes multiple client devices $101_1$-$101_n$ (n>1), each of which hosts a number of applications including a messaging client application. Each messaging client application is communicatively coupled to other instances of the messaging client application via a network 105 (e.g., the Internet). In some embodiments, the messaging client applications are able to communicate and exchange data with each other and with a messaging server system (not shown) via the network 105. Data being exchanged may be live video and audio being recorded by the client devices, or images (e.g., pictures) being captured by a camera included in the client devices.

As used herein, the term "client device" may refer to any machine that interfaces to a communications network (such as network 105) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

The network 105 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS). High Speed Packet Access (HSPA), Worldwide Interoperability for Microwave Access (WiMAX), Long Term Evolution (LTE) standard, others defined by various standard setting organizations, other long range protocols, or other data transfer technology.

Some embodiments may include one or more wearable devices, such as a pendant with an integrated camera that is integrated with, in communication with, or coupled to, a client device $101_1$. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

Figure 2:
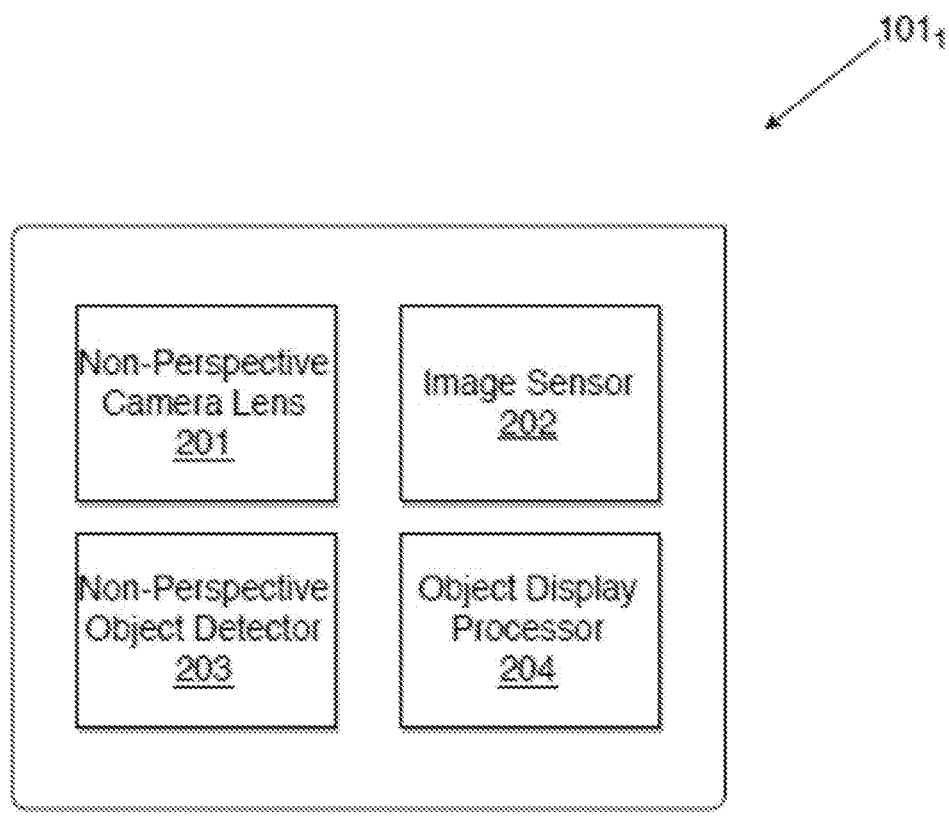
FIG. 2 is block diagram illustrating further details regarding a client device from FIG. 1, according to exemplary embodiments.

FIG. 2 is block diagram illustrating further details regarding a client device $101_1$ from FIG. 1, according to exemplary embodiments. Client device $101_1$ may include a camera with a non-perspective camera lens 201 and an image sensor 202, a non-perspective object detector 203 and an object display processor 204.

Figure 3A:
FIG. 3A-C are examples of a non-perspective image captured by the non-perspective camera lens (FIG. 3A), a perspective image generated from the non-perspective image (FIG. 3B), and the image captured by a tile in the perspective image in FIG. 3B (FIG. 3C), according to various exemplary embodiments.

The non-perspective camera lens 201 may be, for example, a fisheye lens, a wide-angle lens, an omnidirectional lens, etc. The image sensor 202 captures digital images through the non-perspective camera lens 201. The images that are captured are non-perspective images. The images may be a fisheye image, a wide-angle image, a spherical image, etc. The images may be a still image frame or a video including a plurality of still image frames. FIG. 3A illustrates an example of non-perspective image captured by the non-perspective camera lens according to one embodiment of the invention.

Figure 3B:
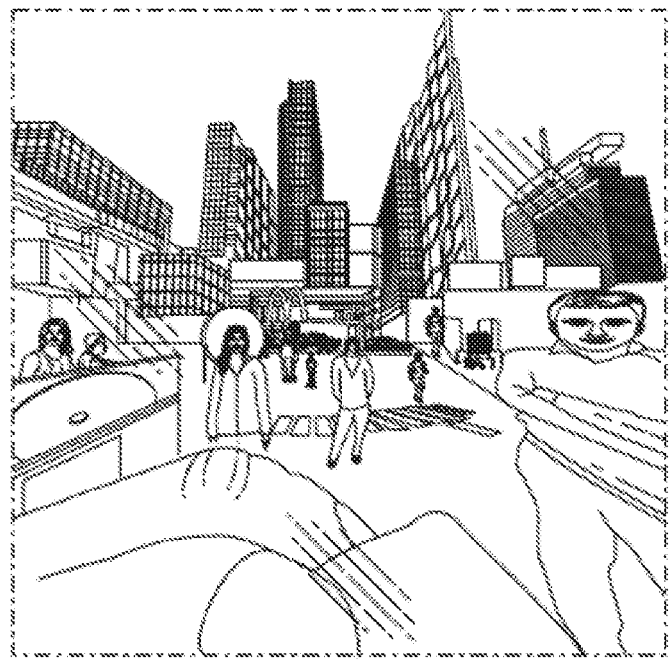
Figure 3C:
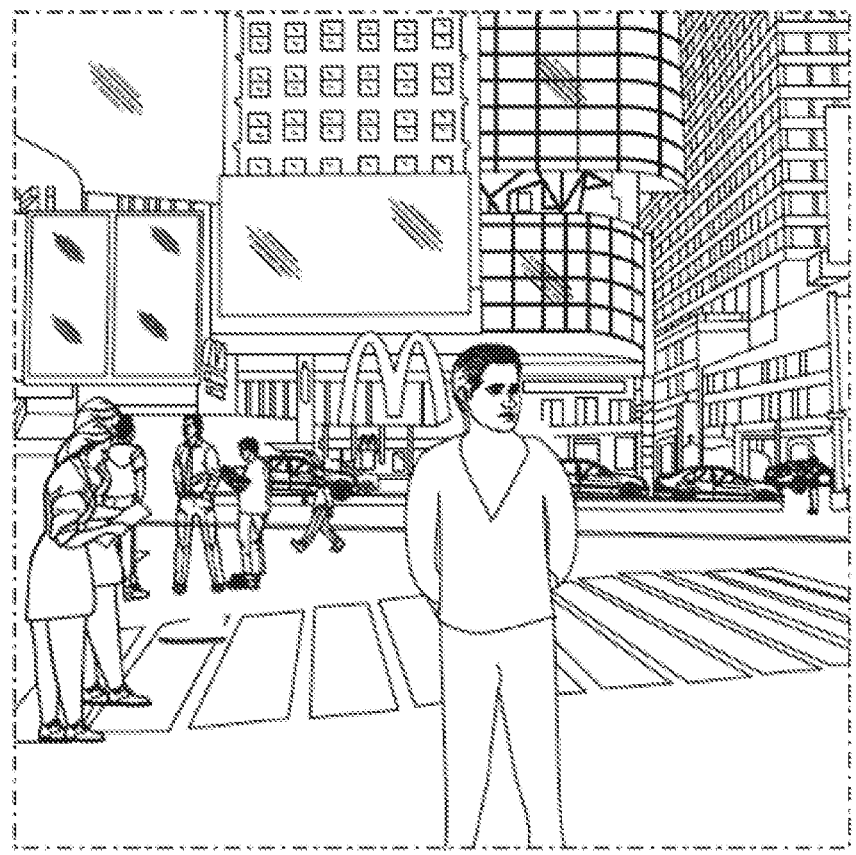

The non-perspective object detector 203 receives the non-perspective image from the image sensor 202 and detects objects therein. Referring to FIG. 3B, an example of a perspective image that is generated from the non-perspective image in FIG. 3A may be generated. In this example, the center area of the perspective image in FIG. 3B is enlarged and shown in FIG. 3C. This image may be an image captured by a tile in the perspective image according to various exemplary embodiments.

Figure 4A:
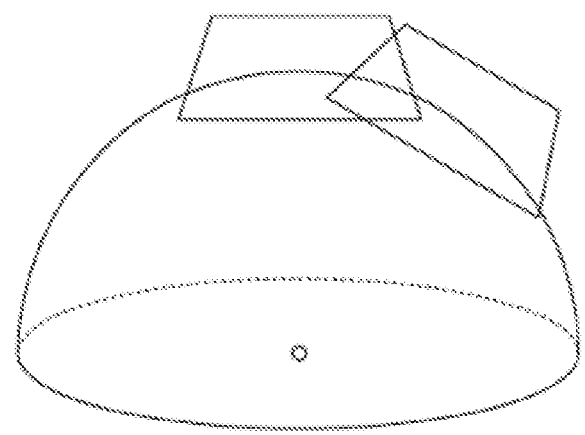
FIG. 4A-B are examples of an arrangement of tiles on a non-perspective lens (FIG. 4A) and the parameters for generating the arrangement of tiles (FIG. 4B) according to various aspects of the disclosure.
Figure 4B:
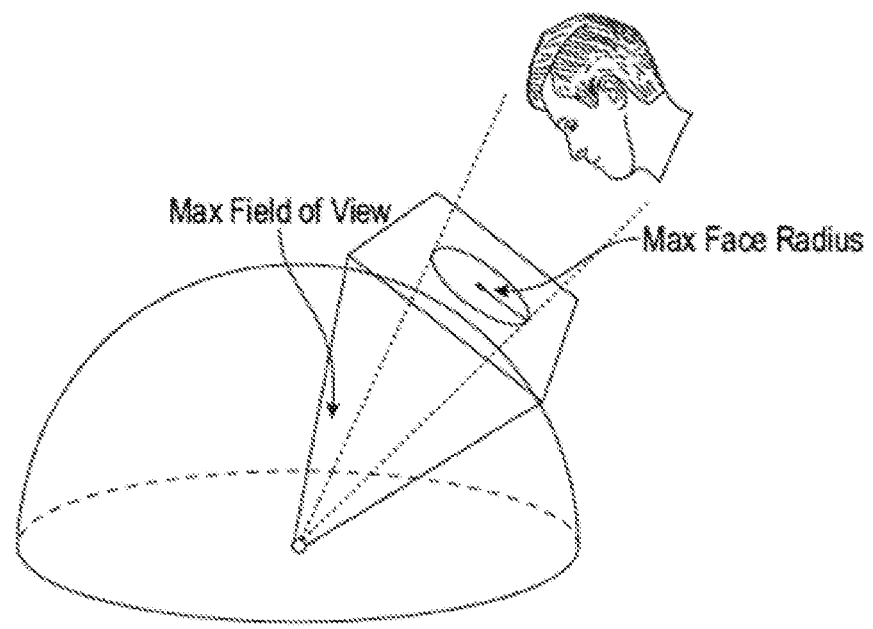

The non-perspective object generator 203 generates an arrangement of tiles. The arrangement of tiles may be based on, for example, a field of view of a non-perspective camera lens, a predetermined size of each of the tiles, and a predetermined maximum object radius. The arrangement of tiles may include the minimum number of tiles to cover the field of view. FIG. 4A-B are examples of an arrangement of tiles on a non-perspective lens (FIG. 4A) and the parameters for generating the arrangement of tiles (FIG. 4B) according to various aspects of the disclosure.

Figure 5:
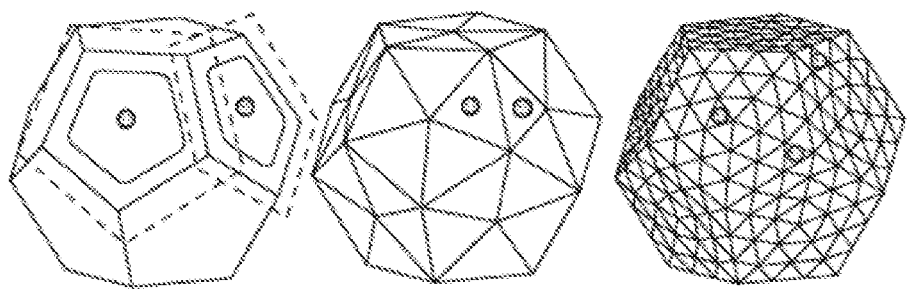
FIG. 5 is an example of an arrangement of tiles on a non-perspective lens in the shape of a dodecahedron and the frequency subdivisions of the tiles according to exemplary embodiments.

In one embodiment, to generate the arrangement of tiles, the non-perspective object detector 203 generates divisions of the field of view of the camera lens and generates frequency sub-divisions of the divisions of the field of view of the camera lens. In FIG. 5, an example of an arrangement of tiles on a non-perspective lens in the shape of a dodecahedron and the frequency subdivisions of the tiles according to exemplary embodiments is illustrated. In FIG. 5, each face of the dodecahedron is a division of the field of view (left image) and the triangles in each of the faces are the frequency subdivisions (center image, right image). The green area of the face of the dodecahedron is the area the non-perspective object detector 203 detects objects most effectively.

The non-perspective object detector 203 then selects a subset of frequency sub-divisions to the arrangement of tiles. Each frequency sub-division in the subset is a tile. The non-perspective object detector 203 adds a frequency sub-division to the subset when adding the frequency sub-division to the subset increases a detection coverage to an object detector. The non-perspective object detector 203 aims to select the minimum number of tiles to cover the field of view of the non-perspective lens 201. In one embodiment, a tile (or selected frequency sub-division) is selected for each object being detected (e.g., a human face). The tile selected for a first object (e.g., an assigned user's face) specifically covers detection of that first object.

Figure 6A:
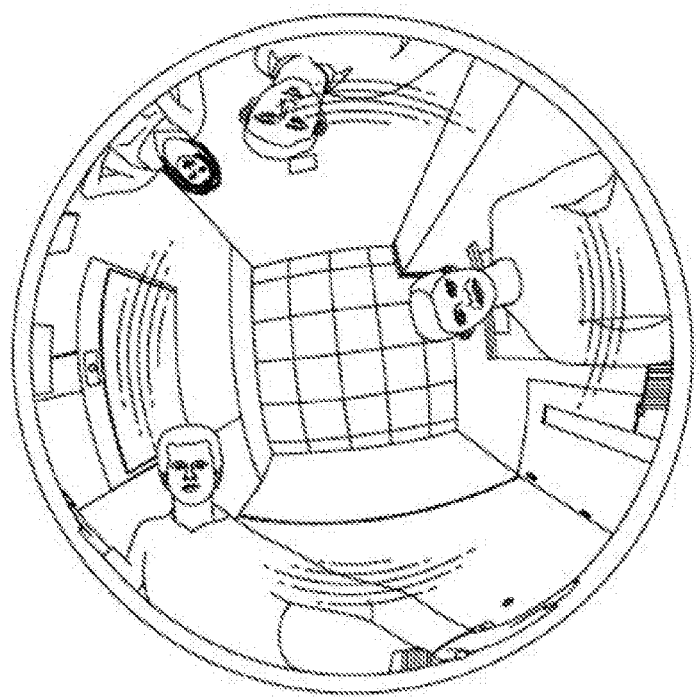
FIG. 6A-B are examples of a non-perspective image (FIG. 6A) and images captured by an arrangement of tiles (FIG. 6B) according to exemplary embodiments.
Figure 6B:
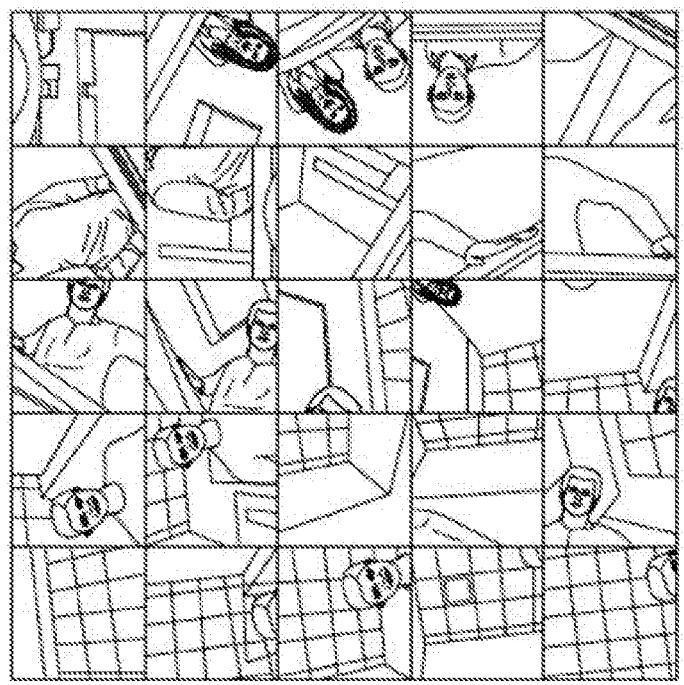

The non-perspective object detector 203 generates images using the tiles, respectively, and searches through the images to detect at least a portion of an object. FIG. 6A-B are examples of a non-perspective image (FIG. 6A) and images captured by an arrangement of tiles (FIG. 6B) according to exemplary embodiments. In one embodiment, using the tiles, the non-perspective object detector 203 generates the images as shown in FIG. 6B. The non-perspective object detector 203 may then search through the images in FIG. 6B to identify the images that include at least a portion of an object. For example, if the object the non-perspective object detector 203 is detecting is a human face, the non-perspective object detector 203 would search for images that include at least a portion of a human face therein. In one embodiment, the non-perspective object detector 203 is rotation-invariant. The non-perspective object detector 203 may be offline trained to detect at least a portion of the object regardless of an orientation of the object in the images. Accordingly, the non-perspective object detector 203 may detect that in the top row of images in FIG. 6B, there are faces in some of the images that are upside down or at an angle.

Figure 7A:
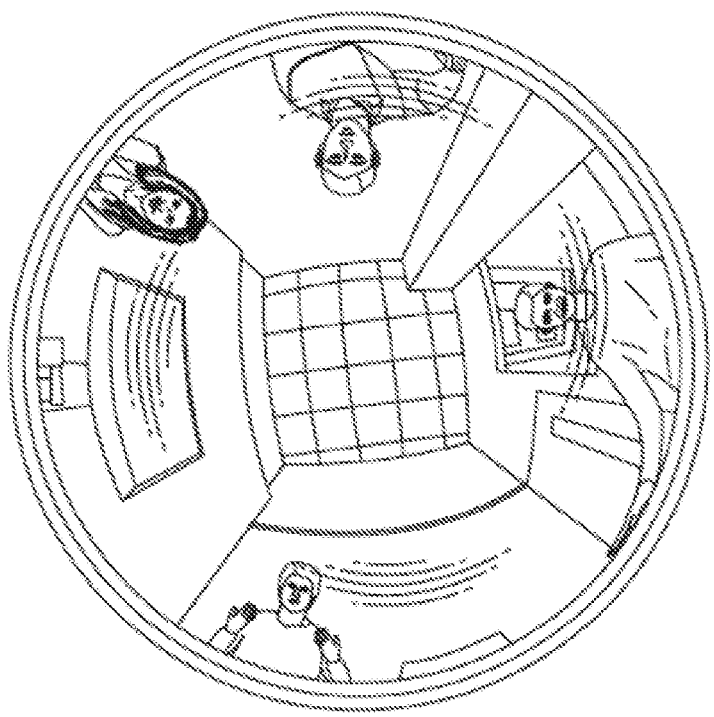
FIG. 7A-B are examples of a non-perspective image (FIG. 7A) and detected objects in the non-perspective image being displayed on a display interface (FIG. 7B) according to exemplary embodiments.
Figure 7B:

The object display processor 204 displays the object on a display interface (e.g., a touch screen or display screen). In one embodiment, the object display processor 204 determines the orientation of the at least the portion of the object that was detected by the non-perspective object detector 203 in the images. Using the images that include at least a portion of the object, the object display processor 204 generates the object in an upright orientation on the display interface. FIG. 7A-B are examples of a non-perspective image (FIG. 7A) and detected objects in the non-perspective image being displayed on a display interface (FIG. 7B) according to exemplary embodiments.

In one embodiment, when the non-perspective image received is a video including a plurality of image frames, the object display processor 204 displays the first object on the display interface as a video of the object. For example, if the first object is a first user's face, the object display processor 204 generates and displays a video of the first user's face. The video of the first user's face is a portion of the non-perspective image (e.g., video) received from the non-perspective camera lens 201. In one embodiment, compared to the non-perspective video captured by the non-perspective camera lens 201, the object display processor 204 displays a cutout of the video (or the portion of the video) which tracks and includes the first user's face.

In one embodiment, the objects being detected by the non-perspective object detector 203 may be human faces (see FIG. 7A) and the object display processor 204 generates the faces right-side-up on at least one the display interface (see FIG. 7A). The non-perspective object detector 203 may detect more than one object (e.g., face) in a non-perspective image and the object display processor 204 may generate the objects simultaneously on the display interface. In another embodiment, the object display processor 204 from client device $101_1$ may transmit a first object in an upright orientation to the object display processor 204 in client device $101_2$ via the network 105 and vice versa, the object display processor 204 from client device $101_2$ may transmit a second object in an upright orientation to the object display processor 204 in client device $101_1$ via the network 105. Both object display processors 204 will generate the first and second objects simultaneously on respective display interfaces. In one embodiment, the first object and the second object are displayed inside a first circle and a second circle, respectively (see FIG. 8).

Figure 8:
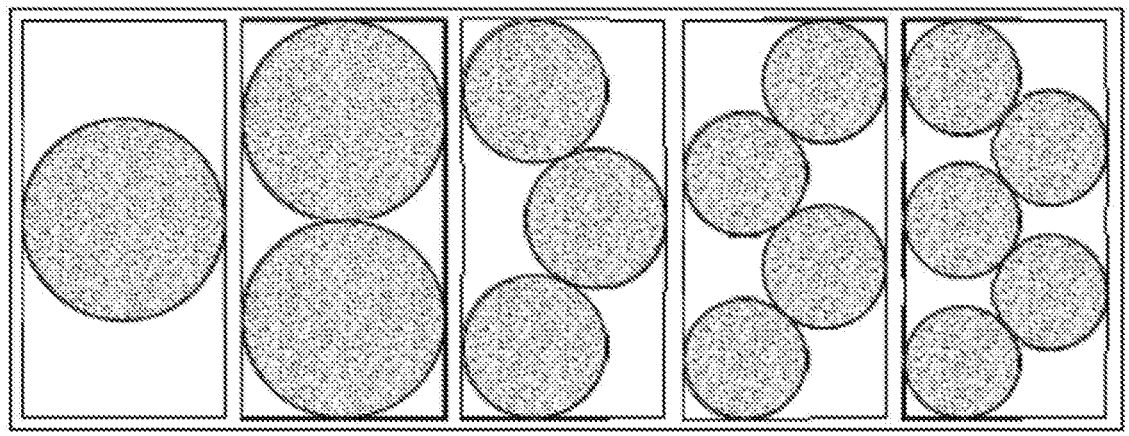
FIG. 8 illustrate examples of an increasing number of objects being displayed on the display interface according to exemplary embodiments.

In generating the first and second objects on a display interface, the object display processor 204 that is displaying a first object on the display interface may add the second object to the display interface. As shown in FIG. 8, examples of an increasing number of objects being displayed on the display interface is illustrated.

In one example embodiment, to display the first and second objects on the display interface, the object display processor 204 determines for the first object a first beginning location and a first end location and reduces a radius of the first circle by a predetermined reduction amount. The predetermined amount may be less than a distance between the first beginning location and the first end location. The object display processor 204 moves the first circle from the first beginning location towards the first end location by the predetermined reduction amount. The object display processor 204 may continue to reduce the radius of the first circle by the predetermined amount and to move the first circle towards the first end location by the predetermined reduction amount until the first object is at the first end location.

In one embodiment, to display the first and second objects on the display interface, the object display processor 204 may determine for the second object a second beginning location and a second end location and increase a radius of the second circle by the predetermined reduction amount. The predetermined amount may be less than a distance between the second beginning location and the second end location. The object display processor 204 may move the second circle from the second beginning location towards the second end location by the predetermined reduction amount. The object display processor 204 continues to increase the radius of the second circle by the predetermined amount and to move the second circle towards the second end location by the predetermined reduction amount until the second object is at the second end location.

In this embodiment, the object display processor 204 minimizes the total distance traveled by each circle and the circles are made to appear as though the circles are nudging towards their (final) end position.

In one embodiment, the object display processor 204 may generate the first object and the second object on the display interface to be subject to a vector-field force, to have drag, and have elasticity when the objects collide with one another. The object display processor 204 may also alter the first object and the second object based on inputs received on the display interface (e.g., responsive to inputs on a touch interface such as tapping, dragging, swiping, etc,).

In one embodiment, the object display processor 204 may determine a first current location on the display interface of the first circle and determine a second current location on the display interface of the second circle. The object display processor 204 may determine a first force corresponding to the first current location and a second force corresponding to the second current location. In one embodiment, to cause the first and second objects to appear to be subject to a vector-field, when the first current location is farther from a center of the display interface than the second current location, the first force is greater than the second force. In one embodiment, the first force and the second force are forces directed towards the center of the display interface. The object display processor 204 may display the first circle as being subject to the first force and the second circle as being subject to the second force.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 9:
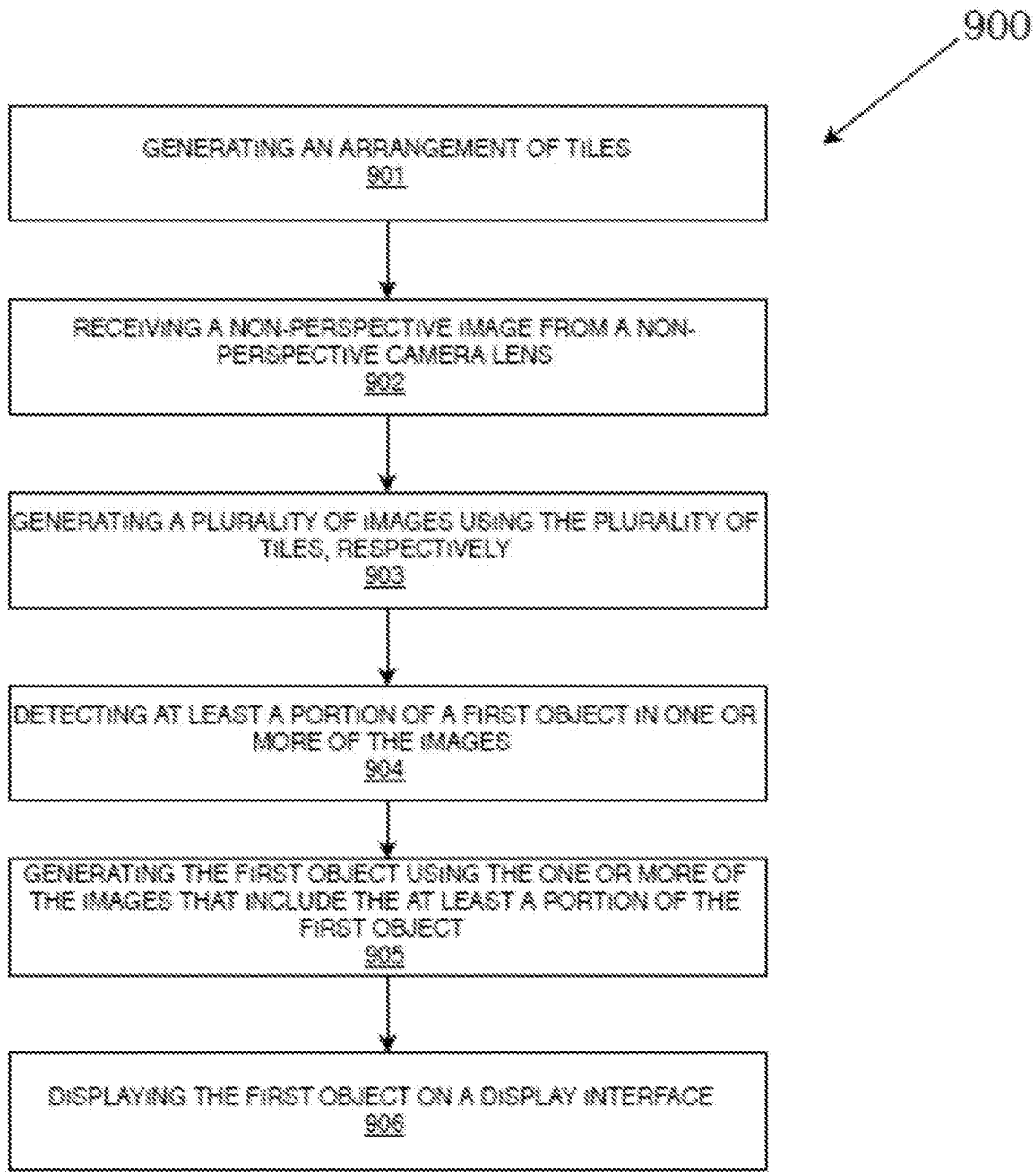
FIG. 9 is a flowchart of a method to detect an object in a non-perspective image according to one example embodiment.

FIG. 9 is a flowchart of a method to detect an object in a non-perspective image according to one example embodiment. The method 900 starts, at Block 901, with a processing device generating an arrangement of a plurality of tiles based on a field of view of a non-perspective camera lens, a predetermined size of each of the tiles, and a predetermined maximum object radius. The minimum number of tiles to cover the field of view is included in the arrangement of the plurality of tiles.

At Block 902, the processing device receives a non-perspective image from the non-perspective camera lens.

At Block 903, the processing device generates a plurality of images using the plurality of tiles, respectively. In one embodiment, to generate the images using the tiles, the processing device generates a plurality of divisions of the field of view of the camera lens, generates a plurality of frequency sub-divisions of the divisions of the field of view of the camera lens; and adds a first frequency sub-division from the plurality of frequency sub-divisions to a subset when adding the first frequency sub-division to the subset increases a detection coverage to an object detector. Each frequency sub-division in the subset is a tile in the arrangement of the plurality of tiles.

At Block 904, the processing device detects at least a portion of a first object in one or more of the plurality of images. In one embodiment, the processing device detects the at least a portion of the first object regardless of an orientation of the first object in the one or more of the plurality of the images.

At Block 905, the processing device generates the first object using the one or more of the plurality of images that include the at least the portion of the first object. The processing device may determine an orientation of the at least the portion of the first object in the one or more of the plurality of images.

At Block 906, the processing device displays the first object on a display interface. The processing device may generate and display the first object in an upright orientation on the display interface. In one embodiment, when the non-perspective image received is a video including a plurality of image frames, the processing device displays the first object on the display interface as a video of the object. The video of the object is a portion of the non-perspective image (e.g., video) received.

In one embodiment, the processing device detect at least a portion of a second object in one or more of the plurality of images, generates the second object using the one or more of the plurality of images that include the at least the portion of the second object, and displays the first object and the second object on the display interface. In this embodiment, the first object and the second object are displayed inside a first circle and a second circle, respectively.

Figure 10:
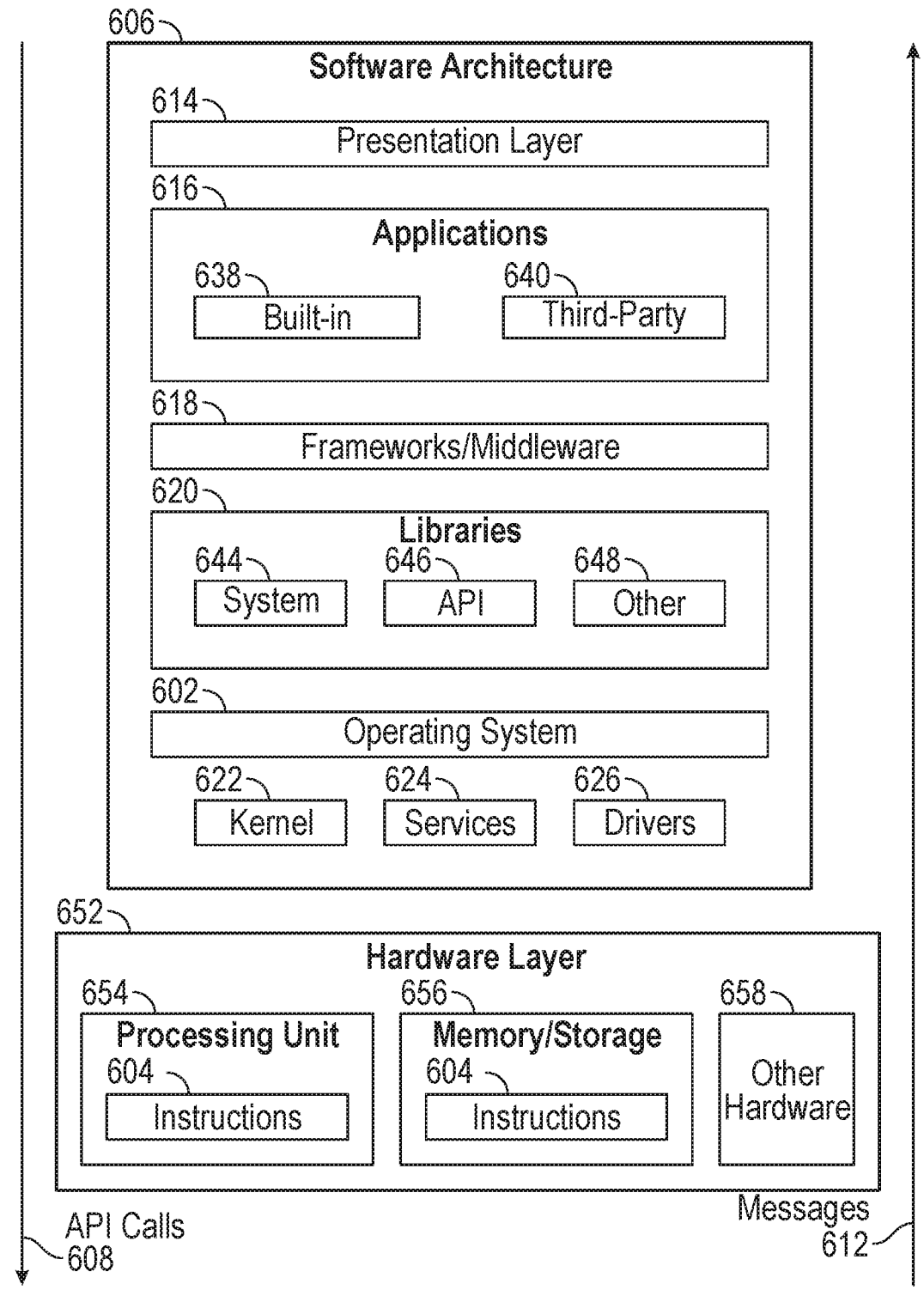
FIG. 10 is a block diagram illustrating a representative software architecture, which may be used in conjunction with various hardware architectures herein described.

FIG. 10 is a block diagram illustrating an exemplary software architecture 606, which may be used in conjunction with various hardware architectures herein described. FIG. 10 is a non-limiting example of a software architecture and it will be appreciated that many other architectures may be implemented to facilitate the functionality described herein. The software architecture 606 may execute on hardware such as machine 700 of FIG. 11 that includes, among other things, processors 704, memory 714, and I/O components 718. A representative hardware layer 652 is illustrated and can represent, for example, the machine 700 of FIG. 11. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes". "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 10, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 620 provide a common infrastructure that is used by the applications 616 or other components or layers. The libraries 620 provide functionality that allows other software components to perform tasks in an easier fashion than to interface directly with the underlying operating system 602 functionality (e.g., kernel 622, services 624 or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4. H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 or other software components/modules, some of which may be specific to a particular operating system 602 or platform.

The applications 616 include built-in applications 638 or third-party applications 640. Examples of representative built-in applications 638 may include, but are not limited to, a contacts application, a browser application, a book reader application, a location application, a media application, a messaging application, or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 11:
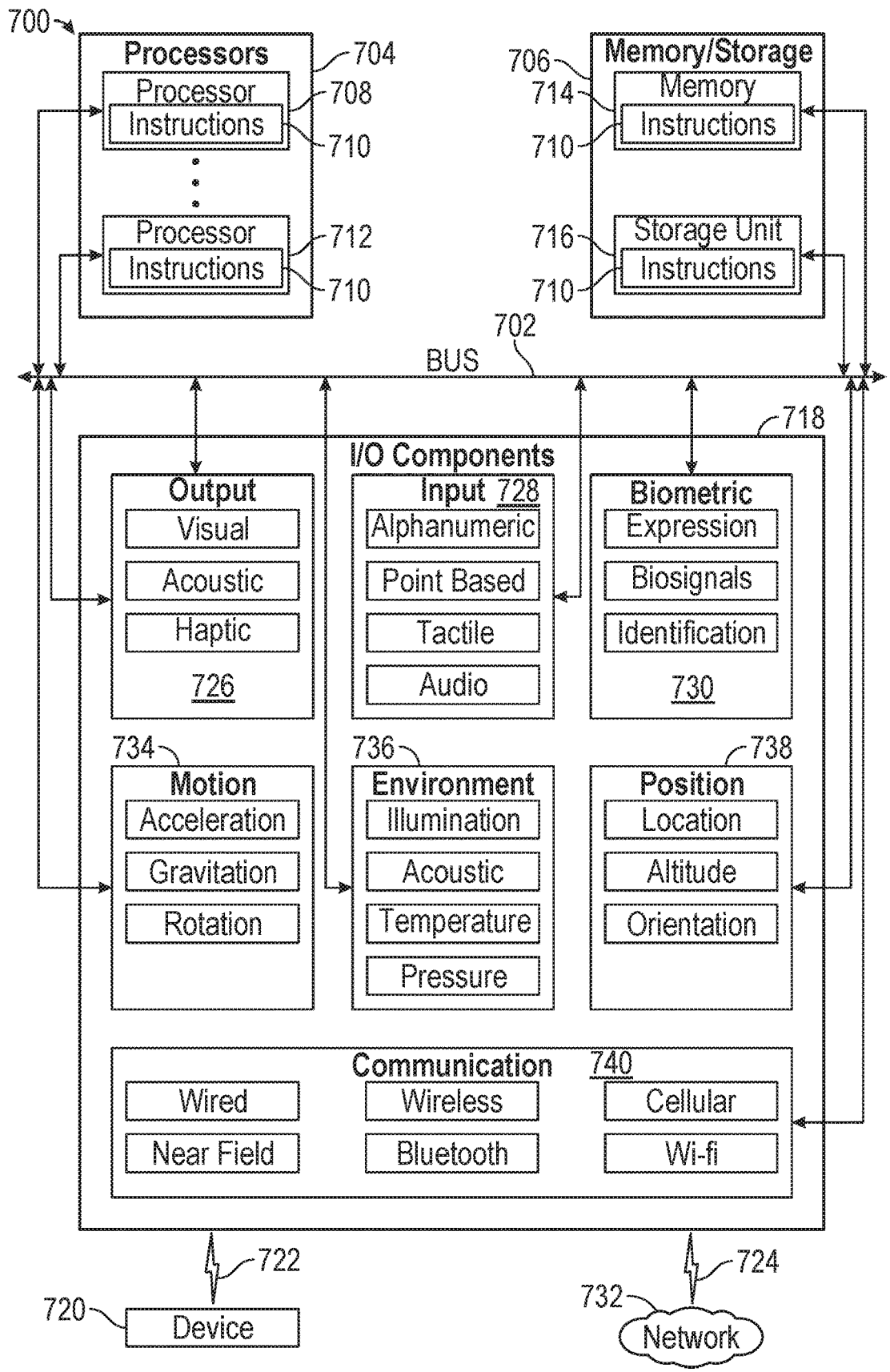
FIG. 11 is a block diagram illustrating components of a machine, according to some exemplary embodiments, able to read instructions from a machine-readable medium (e.g., a machine-readable storage medium) and perform any one or more of the methodologies discussed herein.

FIG. 11 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 11 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 11. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 728 may also include one or more image-capturing devices, such as a digital camera for generating digital images or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, velocity sensor components (e.g., speedometer), rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code. UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A method of detecting objects in non-perspective images comprising:
   generating, by a processor, an arrangement of a plurality of tiles based on a field of view of a non-perspective camera lens, a predetermined size of each of the tiles, and a predetermined maximum object radius, wherein a minimum number of tiles to cover the field of view is included in the arrangement of the plurality of tiles;
   receiving a non-perspective image from the non-perspective camera lens, wherein the non-perspective image comprises a first object and a second object;
   generating a plurality of images using the plurality of tiles;
   detecting a plurality of portions of a first object in a first subset of the plurality of images and a plurality of portions of the second object in a second subset of the plurality of images;
   generating a reconstructed image of the first object using the first subset of the plurality of images and generating a reconstructed image of the second object using the second subset of the plurality of images; and
   displaying the reconstructed image of the first object and the reconstructed image of the second object simultaneously on a display interface.

2. The method of claim 1, wherein the non-perspective image is at least one of: a fisheye image, a wide-angle image, or a spherical image, and the non-perspective image is a still image frame or a video including a plurality of still image frames.

3. The method of claim 1, wherein generating the arrangement of the plurality of tiles further comprises:
   generating a plurality of divisions of the field of view of the camera lens;
   generating a plurality of frequency sub-divisions of the divisions of the field of view of the camera lens; and
   adding a first frequency sub-division from the plurality of frequency sub-divisions to a subset when adding the first frequency sub-division to the subset increases a detection coverage to an object detector, wherein each frequency sub-division in the subset is a tile in the arrangement of the plurality of tiles.

4. The method of claim 1, wherein detecting the plurality of portions of the first object in the first subset of the plurality of images further comprises:
   detecting the plurality of portions of the first object regardless of an orientation of the first object in the first subset of the plurality of the images.

5. The method of claim 1, wherein generating the reconstructed image of the first object further comprises:
   determining an orientation of the plurality of portions of the first object in the first subset of the plurality of images, and generating the reconstructed image of the first object in an upright orientation on the display interface.

6. The method of claim 5, wherein the first object is a first human face and the second object is a second human face, wherein the first object and the second object are displayed right-side-up on the display interface.

7. The method of claim 1, wherein displaying the reconstructed image of the first object and the reconstructed image of the second object simultaneously on the display interface further comprises:
   displaying on the display interface the reconstructed image of the first object inside a first circle and the reconstructed image of the second object inside a second circle.

8. The method of claim 7, wherein displaying the reconstructed image of the first object and the reconstructed image of the second object simultaneously on the display interface further comprises:
   determining for the first object a first beginning location and a first end location, reducing a radius of the first circle being displayed by a predetermined reduction amount, wherein the predetermined amount is less than a distance between the first beginning location and the first end location, moving the first circle being displayed from the first beginning location towards the first end location by the predetermined reduction amount, and continuing to reduce the radius of the first circle being displayed by the predetermined amount and to move the first circle being displayed towards the first end location by the predetermined reduction amount until the first object is at the first end location.

9. The method of claim 8, wherein displaying the reconstructed image of the first object and the reconstructed image of the second object simultaneously on the display interface further comprises:

determining for the second object a second beginning location and a second end location, increasing a radius of the second circle being displayed by the predetermined reduction amount, wherein the predetermined amount is less than a distance between the second beginning location and the second end location, moving the second circle being displayed from the second beginning location towards the second end location by the predetermined reduction amount, continuing to increase the radius of the second circle being displayed by the predetermined amount and to move the second circle being displayed towards the second end location by the predetermined reduction amount until the second object is at the second end location.

10. The method of claim 7, wherein displaying the reconstructed image of the first object and the reconstructed image of the second object simultaneously on the display interface further comprises:

determining a first current location on the display interface of the first circle, and determining a second current location on the display interface of the second circle;

determine a first force corresponding to the first current location and a second force corresponding to the second current location, wherein when the first current location is farther from a center of the display interface than the second current location, the first force is greater than the second force, wherein the first force and the second force are forces directed towards the center of the display interface, and displaying the first circle as being subject to the first force and the second circle as being subject to the second force.

11. The method of claim 10, wherein the first circle and the second circle are displayed on the display interface as having drag and collision elasticity.

12. A system comprising:
a non-perspective camera lens;
a processor; and
a memory having instructions stored thereon, when executed by the processor, causes the system to perform operations comprising:
generating an arrangement of a plurality of tiles based on a field of view of the non-perspective camera lens, a predetermined size of each of the tiles, and a predetermined maximum object radius, wherein a minimum number of tiles to cover the field of view is included in the arrangement of the plurality of tiles;

receiving a non-perspective image from the non-perspective camera lens, wherein the non-perspective image comprises a first object and a second object;

generating a plurality of images using the plurality of tiles;

detecting a plurality of portions of a first object in a first subset of the plurality of images and a plurality of portions of the second object in a second subset of the plurality of images;

generating a reconstructed image of the first object using the first subset of the plurality of images and generating a reconstructed image of the second object using the second subset of the plurality of images; and displaying the reconstructed image of the first object and the reconstructed image of the second object simultaneously on a display interface.

13. The system of claim 12, wherein generating the arrangement of the plurality of tiles further comprises:

generating a plurality of divisions of the field of view of the camera lens;

generating a plurality of frequency sub-divisions of the divisions of the field of view of the camera lens; and adding a first frequency sub-division from the plurality of frequency sub-divisions to a subset when adding the first frequency sub-division to the subset increases a detection coverage to the object detector, wherein each frequency sub-division in the subset is a tile in the arrangement of the plurality of tiles.

14. The system of claim 12, further comprising: a rotation-invariant object detector, wherein the object detector is offline trained to detect the plurality of portions of the first object regardless of an orientation of the first object in the first subset of the plurality of the images.

15. The system of claim 12, wherein the system generating the first object further comprises:

determining an orientation of the plurality of portions of the first object in the first subset of the plurality of images, and generating the reconstructed image of the first object in an upright orientation on the display interface.

16. The system of claim 15, wherein the first object is a first human face and the second object is a second human face, wherein the first object and the second object are displayed right-side-up on the display interface.

17. The system of claim 12, wherein displaying the reconstructed image of the first object and the reconstructed image of the second object simultaneously on the display interface further comprises:

displaying on the display interface the reconstructed image of the first object inside a first circle and the reconstructed image of the second object inside a second circle.

18. The system of claim 17, wherein displaying the reconstructed image of the first object and the reconstructed image of the second object simultaneously on the display interface further comprises:

determining for the first object a first beginning location and a first end location, reducing a radius of the first circle being displayed by a predetermined reduction amount, wherein the predetermined amount is less than a distance between the first beginning location and the first end location, moving the first circle being displayed from the first beginning location towards the first end location by the predetermined reduction amount, continuing to reduce the radius of the first circle being displayed by the predetermined amount and to move the first circle towards the first end location by the predetermined reduction amount until the first object is at the first end location, determining for the second object a second beginning location and a second end location, increasing a radius of the second circle being displayed by the predetermined reduction amount, wherein the predetermined amount is less than a distance between the second beginning location and the second end location, moving the second circle being displayed from the second beginning location towards the second end location by the predetermined reduction amount, and continuing to increase the radius of the second circle being displayed by the predetermined amount and to move the second circle being displayed towards the second end location by the predetermined reduction amount until the second object is at the second end location.

19. The system of claim 17, wherein the system displaying the reconstructed image of the first object and the reconstructed image of the second object simultaneously on the display interface further comprises:

determining a first current location on the display interface of the first circle, determining a second current location on the display interface of the second circle, determining a first force corresponding to the first current location and a second force corresponding to the second current location, wherein when the first current location is farther from a center of the display interface than the second current location, the first force is greater than the second force, wherein the first force and the second force are forces directed towards the center of the display interface, and displaying the first circle as being subject to the first force and the second circle as being subject to the second force.

20. A non-transitory computer-readable storage having instructions stored thereon, when executed by a processor, causes the processor to perform operations comprising:

generating an arrangement of a plurality of tiles based on a field of view of a non-perspective camera lens, a predetermined size of each of the tiles, and a predetermined maximum object radius, wherein a minimum number of tiles to cover the field of view is included in the arrangement of the plurality of tiles;

receiving a non-perspective image from the non-perspective camera lens, wherein the non-perspective image comprises a first object and a second object;

generating a plurality of images using the plurality of tiles;

detecting a plurality of portions of a first object in a first subset of the plurality of images and a plurality of portions of the second object in a second subset of the plurality of images;

generating a reconstructed image of the first object using the first subset of the plurality of images and generating a reconstructed image of the second object using the second subset of the plurality of images; and displaying the reconstructed image of the first object and the reconstructed image of the second object simultaneously on a display interface.

\* \* \* \* \*